(12) United States Patent
Jongsma et al.

(10) Patent No.: US 10,017,313 B2
(45) Date of Patent: Jul. 10, 2018

(54) EXPANDABLE CONTAINER HAVING LID FOR PROVIDING HEADSPACE CONTROL IN A FOOD CAN

(71) Applicant: ARDAGH MP GROUP NETHERLANDS B.V., Ah Deventer (NL)

(72) Inventors: Jelmer Eelke Jongsma, La Fleche (FR); Jean-Francois Jouillat, Bauge (FR)

(73) Assignee: ARDAGH MP GROUP NETHERLANDS B.V. (NL)

( * ) Notice: Subject to any disclaimer, the term of this patent is extended or adjusted under 35 U.S.C. 154(b) by 116 days.

(21) Appl. No.: 15/200,828

(22) Filed: Jul. 1, 2016

(65) Prior Publication Data

US 2016/0355316 A1    Dec. 8, 2016

Related U.S. Application Data

(62) Division of application No. 12/162,923, filed as application No. PCT/EP2007/051053 on Feb. 2, 2007, now Pat. No. 9,617,056.

(30) Foreign Application Priority Data

Feb. 3, 2006    (DE) .................. 10 2006 005 058

(51) Int. Cl.
*B65D 79/00*    (2006.01)
*B65D 53/02*    (2006.01)
(Continued)

(52) U.S. Cl.
CPC .......... *B65D 79/005* (2013.01); *B29C 51/002* (2013.01); *B29C 51/08* (2013.01);
(Continued)

(58) Field of Classification Search
CPC .................. B65D 53/02; B65D 79/005; B65D 2517/5054; B65D 17/502; B29C 51/002;
(Continued)

(56) References Cited

U.S. PATENT DOCUMENTS

| | | | | |
|---|---|---|---|---|
| 549,130 | A | * | 11/1895 | Hughes .................. A47B 61/00 108/29 |
| 1,162,520 | A | * | 11/1915 | Shaffer .................. A23K 40/00 426/395 |

(Continued)

FOREIGN PATENT DOCUMENTS

| AU | 62 982/73 | 5/1975 |
|---|---|---|
| AU | 41 910/78 | 5/1980 |

(Continued)

OTHER PUBLICATIONS

International Search Report for PCT/EP2007/051053 dated Jun. 5, 2007, 3 pages.

*Primary Examiner* — Bayan Salone
(74) *Attorney, Agent, or Firm* — Hunton & Williams LLP

(57) ABSTRACT

Expandable containers having lids for providing headspace control in food can are disclosed. In one embodiment, a process for producing a lid closure for cans containing foodstuff, the lid providing tightness during sterilization or pasteurization in a continuous autoclave, said cans being closed with a can closure may include (1) producing the can closure from an annular ring adapted for seaming to the can body and a lid panel having an outer ring band sealingly affixed onto an inner flat web; and (2) reshaping a central area of the lid panel by deep drawing to a smooth bowl shape or a dome shape with a plane surface, as original shape, a material of this central area thereby solidified or hardened to such an extent that under an increased pressure in a headspace of the can during a passage thereof through an autoclave station, the central area changes to an axially (Continued)

outwardly bulged shape that is mirror-inverted with respect to the original shape and, during a subsequent cooling of the can, the central area automatically returns substantially to the original shape thereof. The reshaping may be done prior to attaching the lid to the filled can, and the lid pane may be limited by an outer ring band.

12 Claims, 7 Drawing Sheets

(51) Int. Cl.

| | |
|---|---|
| B65D 17/50 | (2006.01) |
| B29C 51/00 | (2006.01) |
| B29C 51/08 | (2006.01) |
| B29C 51/14 | (2006.01) |
| B29C 65/14 | (2006.01) |
| B29C 69/00 | (2006.01) |
| B29K 105/00 | (2006.01) |
| B29L 31/00 | (2006.01) |

(52) U.S. Cl.
CPC .............. *B29C 51/14* (2013.01); *B29C 65/14* (2013.01); *B29C 69/00* (2013.01); *B65D 17/502* (2013.01); *B65D 53/02* (2013.01); *B29K 2105/256* (2013.01); *B29L 2031/712* (2013.01); *B65D 2517/5054* (2013.01)

(58) Field of Classification Search
CPC ....... B29C 51/08; B29C 51/014; B29C 69/00; B29C 65/14; B29K 2105/256; B29L 2031/712; Y10T 29/49908; Y10T 29/49915; Y10T 29/49922; Y10T 29/49936
USPC ...... 220/254.1, 359.1, 359.2, 609, 612, 613, 220/619, 694, 699, 639; 229/123.1, 229/125.13, 125.14; 426/407; 29/428, 29/505, 509, 513, 521
See application file for complete search history.

(56) References Cited

U.S. PATENT DOCUMENTS

| | | | | |
|---|---|---|---|---|
| 2,971,671 A * | 2/1961 | Shakman | ............... | B65D 7/04 220/609 |
| 3,369,689 A * | 2/1968 | Dodge | ............... | B65D 41/14 215/262 |
| 3,628,689 A * | 12/1971 | Rogers | ............... | B65D 17/502 220/270 |
| 3,789,785 A * | 2/1974 | Petit | ............... | B21D 51/26 99/359 |
| 3,814,279 A * | 6/1974 | Rayzal | ............... | B21D 51/44 220/624 |
| 3,894,652 A * | 7/1975 | Brown | ............... | B65D 17/163 220/270 |
| 4,087,018 A * | 5/1978 | Tebbutt | ............... | B65D 53/02 206/807 |
| 4,088,242 A * | 5/1978 | Schellenberg | ........ | B21D 51/383 220/258.2 |
| 4,125,632 A * | 11/1978 | Vosti | ............... | B65D 15/18 206/524.8 |
| 4,129,085 A * | 12/1978 | Klein | ............... | B21D 51/383 413/14 |
| 4,211,338 A * | 7/1980 | Bublitz | ............... | B65D 77/2024 220/359.1 |
| 4,253,584 A * | 3/1981 | Bloeck | ............... | B21D 51/383 220/265 |
| 4,332,332 A * | 6/1982 | Ingemann | ........... | B65D 43/0272 220/266 |
| 4,542,029 A * | 9/1985 | Caner | ............... | B65B 7/2878 206/519 |
| 4,680,917 A * | 7/1987 | Hambleton | ........... | B65D 17/502 53/440 |
| 4,915,254 A * | 4/1990 | Zumsteg | ............... | B21D 51/383 220/265 |
| 4,998,638 A * | 3/1991 | Kawamata | ........... | B65D 79/005 215/270 |
| 5,016,769 A * | 5/1991 | Heilman | ............... | B65D 79/005 215/230 |
| 5,069,355 A * | 12/1991 | Matuszak | ........... | B65D 17/502 220/270 |
| 5,125,632 A * | 6/1992 | Blatt | ................ | B23K 37/0408 269/32 |
| 5,752,614 A * | 5/1998 | Nelson | ............... | B65D 17/502 220/254.1 |
| 5,804,237 A * | 9/1998 | Diamond | ............... | A23L 3/02 220/609 |
| 6,036,043 A * | 3/2000 | Erfgen | ............... | B65D 17/163 220/270 |
| 6,702,538 B1 * | 3/2004 | Heinicke | ............... | B21D 51/38 413/56 |
| 6,817,819 B2 * | 11/2004 | Olson | ............... | B65D 17/20 220/266 |
| 7,055,713 B2 * | 6/2006 | Rea | ............... | B65D 17/505 220/270 |
| 8,240,501 B2 * | 8/2012 | Claydon | ............... | B65D 79/005 220/213 |
| 9,340,344 B2 * | 5/2016 | Tamaro | ............... | B65D 21/0219 |
| 9,617,056 B2 * | 4/2017 | Jongsma | ............... | B65D 17/502 |
| 2001/0041115 A1* | 11/2001 | Erfgen | ............... | B21D 51/44 413/1 |
| 2005/0145630 A1* | 7/2005 | Williams | ............... | B65D 17/502 220/359.3 |
| 2006/0151503 A1* | 7/2006 | Claydon | ............... | B65D 17/502 220/359.1 |
| 2006/0214430 A1* | 9/2006 | Wolfgang | ............... | B65D 17/502 292/80 |
| 2009/0101648 A1* | 4/2009 | Jongsma | ............... | B29C 65/1635 220/270 |
| 2009/0261099 A1* | 10/2009 | Jongsma | ............... | B65D 17/502 220/213 |

FOREIGN PATENT DOCUMENTS

| | | |
|---|---|---|
| BE | 532675 | 11/1954 |
| CH | 593 180 A5 | 11/1977 |
| DE | 262 652 | 1/1912 |
| DE | 22 24 084 | 11/1972 |
| DE | 22 58 462 | 6/1974 |
| DE | 28 30 614 A1 | 1/1980 |
| DE | 30 43 899 C2 | 6/1981 |
| DE | 31 05 911 A1 | 11/1982 |
| DE | 88 02 824 U1 | 8/1989 |
| DE | 92 03 953 U1 | 9/1992 |
| DE | 41 26 027 C2 | 2/1993 |
| DE | 41 40 198 A1 | 6/1993 |
| DE | 43 32 306 A1 | 3/1995 |
| DE | 91 17 216 U1 | 6/1997 |
| DE | 198 22 739 C1 | 11/1999 |
| DE | 299 21 599 U1 | 5/2000 |
| DE | 601 01 454 T2 | 10/2004 |
| DE | 103 38 445 B4 | 2/2007 |
| EP | 0 090 957 A2 | 10/1983 |
| EP | 0 262 652 B1 | 4/1988 |
| EP | 0 419 764 A1 | 4/1991 |
| EP | 0 512 832 | 11/1992 |
| EP | 0 545 143 B1 | 6/1993 |
| EP | 0 959 323 A2 | 11/1999 |
| EP | 1 153 840 A1 | 11/2001 |
| EP | 1 419 972 B1 | 5/2004 |
| EP | 1 559 655 A1 | 8/2005 |
| EP | 1 584 567 A2 | 10/2005 |
| EP | 1 777 165 A1 | 4/2007 |
| EP | 1 945 522 B1 | 4/2007 |
| FR | 2 137 293 A1 | 12/1972 |
| GB | 214 968 A | 4/1924 |

(56) References Cited

FOREIGN PATENT DOCUMENTS

| | | |
|---|---|---|
| GB | 454 429 A | 3/1935 |
| GB | 1 274 542 A | 5/1972 |
| GB | 1 549 668 A | 8/1979 |
| GB | 2 022 474 A | 12/1979 |
| GB | 2 237 259 A | 5/1991 |
| GB | 2 244 254 A1 | 11/1991 |
| JP | 01308770 A | 12/1989 |
| JP | 04087963 A1 | 3/1992 |
| WO | 91 08958 A1 | 6/1991 |
| WO | 97 14614 A1 | 4/1997 |
| WO | 01 19683 A1 | 3/2001 |
| WO | WO 2005005277 | 1/2005 |
| WO | WO 2005005277 A8 * | 3/2006 ........... B65D 17/502 |
| WO | 2007 045385 A1 | 4/2007 |

\* cited by examiner

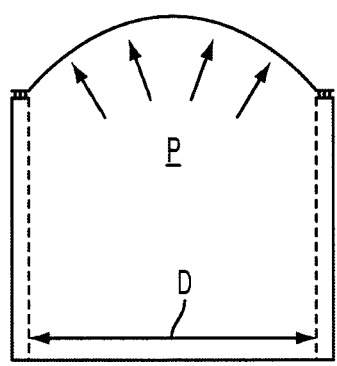
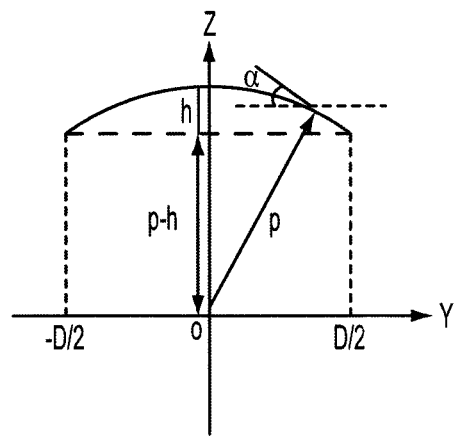
FIG. 6          FIG. 6a
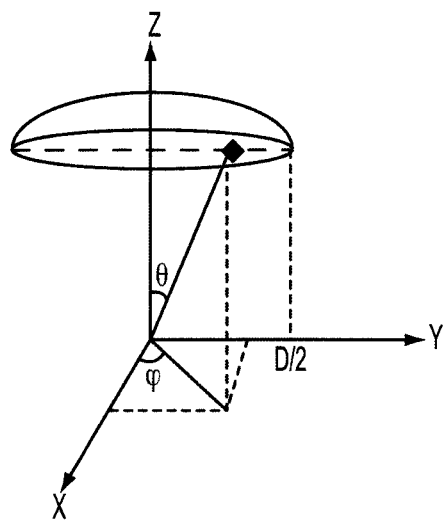
FIG. 7

EXPANDABLE CONTAINER HAVING LID FOR PROVIDING HEADSPACE CONTROL IN A FOOD CAN

RELATED APPLICATIONS

This patent application is a Divisional of U.S. patent application Ser. No. 12/162,923, filed Feb. 9, 2009, now U.S. Pat. No. 9,617,056, which claims priority the disclosure of which is hereby incorporated by reference in its entirety

BACKGROUND OF THE INVENTION

1. Field of the Invention

The invention relates to lids for cans for receiving foodstuff, which are to be subjected to a thermal treatment above 50° C. in the form of sterilization or at least pasteurization. Methods for the production of the lids and for securing the leak tightness of the sealing are also covered.

2. Description of the Related Art

Lids are concerned having an annular ring for seaming to the can body, the lid can be firmly and tightly connected with the can body rim and is in particular made from metal, and a "lid diaphragm" (diaphragm or panel) in the form of a cover surface which is affixed to the annular ring (for seaming to the can body) in such a way that, for the opening of the can, the panel can be pulled off from the seamable annular ring or may be peeled off from it by means of pulling. This relates on the one hand to peeling foils and, on the other hand, also to foils which are to be torn at the edge or are to be further torn.

Various designs of such lid covers are known, see U.S. Pat. No. 4,211,338 (Bublitz). Difficulties with these lids arise at high temperatures, at any rate above 50° C., as they are—as a rule—present in sterilization or pasteurization processes in continuous autoclaves (retorts). The lid will leak or the lid diaphragm even begins to detach itself from the annular ring under the action of a difference in pressure which acts upon the lid, or can be damaged in such a way that this would result in a later leakage at the sealing line.

Consequently, these cans are mostly sterilized in such autoclaves (batch retort stations) which are equipped with means for generating an outer air or vapor pressure in order to apply a sufficient counter-pressure onto an outer surface of the lid, opposing the internal pressure in the closed can, due to which the lid, in particular the lid diaphragm, will be protected against too high differences in pressure ΔP.

It is not possible or requires great effort to equip "continuous autoclaves" with such counter-pressure means that are suitable for continuous passage.

Continuous autoclaves (for a pasteurization or a sterilization process) with a counterpressure due to a vapour atmosphere certainly generate a low permanent counterpressure on the lid surface of up to 1.6 bar (0.16 MPa), but they are not sufficient for stabilizing customary "peel lids" without damage.

In addition to this, the lid surface does not form any smooth, fine-looking surface after cooling of the cans, which impairs acceptance by the customers and results in illegibility of any type of inscriptions or bar codes by scanners.

SUMMARY OF THE INVENTION

It is an object of the invention, to remedy this by a lid of this peel type which allows a safe sterilization of filled and closed cans in continuous autoclaves (high temperature prevailing there and a resultant high pressure in the can) without the risk of the breaking, breaking up or detaching of a plane (surface oriented) cover panel on or from the seamable annular ring.

After the cooling of the can, the lid is also to have an acceptable appearance.

These objects is attained concerning the lid.

The invention also comprises steps for "ensuring" the tightness of the can closures during sterilization in a continuous autoclave in the sense of a securing or providing of tightness on the can closures that work with an "annular ring" (for seaming to the can body). Production processes for the can closure are disclosed.

The invention is not limited to lids for cans of a circular cross-section, but can also be applied with the same effect and the same advantages to cans of other circumferential or cross-sectional shapes such as oval, rectangular, rectangular with rounded corners or square shapes of cans (can bodies).

The "dome- or bowl-shaped preformation" (or deformation) of the cover panel allows—after filling with food or foodstuff and upon closing of each can with the lid—to substantially reduce the headspace in the can since the curved shape with its centre projects substantially downwards beyond that area of the annular ring that is placed innermost of a can body inside. If, under the internal pressure formed during the thermal heating in the interior of the can, the dome- or bowl-shaped panel portion then changes, in particular abruptly changes, to a bulging position that is mirror-inverted to the original position, now towards the outside, resulting in a substantial enlargement of the headspace and thus a reduction of the pressure in the can formed during thermal treatment.

This change function is supported by a stiffening of the cover panel at least in the central portion by the preformation of this portion. A plane material is used for this purpose, which itself or a layer thereof will get harder due to the deep-drawing process. Thus, a certain shape keeping hardness or stability results from this as a tightening. Said stability is distributed across the entire panel surface, radially within the annular ring. The panel surface is named plane or "areal oriented" as the surface has a lateral extension but on a curved panel, that is plane, but not flat.

This stability achieves that practically the same, but reversed or inverted panel shape is obtained upon outwards directed bulging. It corresponds to the inverted original dome shape without increasing the surface area, without plastic preformation, in particular without a "stretching" of the panel. After the temperature is reduced, the central portion of the cover panel is again returned to its preformed original shape upon cooling, which it adopts without any further help (due to the vacuum formed in the inner space and "under the panel").

The smooth dome or bowl shape (preformed bulging) of the lid of the can that is ready for sale is very fine-looking and does not encounter any problems as regards acceptance by customers.

The process is for producing a lid closure for cans containing foodstuff. The lid provides tightness during sterilization or pasteurization in a continuous autoclave. Said cans being closed with a can closure as lid. The can closure is produced from an annular ring (adapted for seaming to the can body, a so called "Deckelring") and a lid panel having an outer ring band. The band is sealingly placed onto an inner flat web. Prior to attaching the lid to the filled can a central area of the lid panel is reshaped by deep drawing to a smooth bowl shape or a dome shape with a plane surface, this as "original shape". An outer ring band limits the central area (surrounds it in case of a circular lid). A material of this central area is solidified or hardened by the deep drawing process (step), this to such an extent that under an increased pressure in a headspace of the can during the can's passage through an autoclave station, the central area changes to an axially outwardly bulging shape that is mirror-inverted. The inversion is with respect to the "original shape". During a subsequent cooling of the closed can, the central area automatically returns to the "original shape". This is at least substantially the same.

The claimed lid permits a sterilization or pasteurization of the filled cans at the pertinent high temperatures and differential pressures in continuous autoclaves readily and without any risks, i.e. without any measure for generating a counter-pressure that additionally acts from the outside (other than the steam pressure). The steam pressure (vapor pressure) is regularly present, higher than atmospheric pressure, but not high enough to support forces on the outer surface of the lid.

The dimensions of the preformed shape (of the central portion) can be easily adjusted to the diameter and the volume of the cans. Likewise, the inclination of the flat web of the annular ring for seaming to the can body to which the outer ring band of the panel is affixed is adjusted in such a way with respect to a horizontal plane that an imaginary extension of the surface of the flat web extends at best tangentially to the dome- or inverted-bowl shaped central portion that bulges outwardly under pressure. The inclination of the web is directed upwards; this is "outwards axially" when the can body is taken as a reference, that is closed by the lid panel and the lid ring.

A preferred lid is adapted for closing a can with a diameter of 83 mm. The depth of the preformed lid panel is between 5 mm and 6 mm, approx. 5.6 mm, the lowermost point of it being about 3 mm below the lowermost points of the annular ring for seaming to the can body. The bulging corresponds to a sphere segment in the case of a circular cross-section of the lid. The angle of the flat web is preferably between 22° and 25° with respect to the horizontal. Here, peeling forces are practically completely avoided.

The smooth/plane bowl/dome surface of the preformed lid panel is not disturbed by or interfered with any undulations or grooves.

The filled can with the lid can be at least pasteurized, in particular even sterilized, in practically any of the known continuous autoclaves without additional counter-pressure means. The food in kept therein for a long time, resulting from thermal treatment The production process of the lid closure is the subject matter disclosed. The preformation (preforming) of the panel in the central area takes place in the same fashion. The processes permit the use of already used machines, in particular during a sealing on a plane flat web with subsequent inclined deformation of the web upwards/outwards. The panel surface may be applied onto the already inclined flat web or the—still plane—flat web which is to be inclined after heat sealing.

BRIEF DESCRIPTION OF THE DRAWINGS

The invention is explained in greater detail in the following, using schematic drawings and embodiments serving as examples.

FIG. 6 2D sphere shape of a panel on a can body in theoretical evaluation (no annular ring displayed).

FIG. 6a is a 2D sketch of FIG. 6.

FIG. 7 shows the 3D model of FIG. 6a.

DETAILED DESCRIPTION OF PREFERRED EMBODIMENTS

Figure 1:
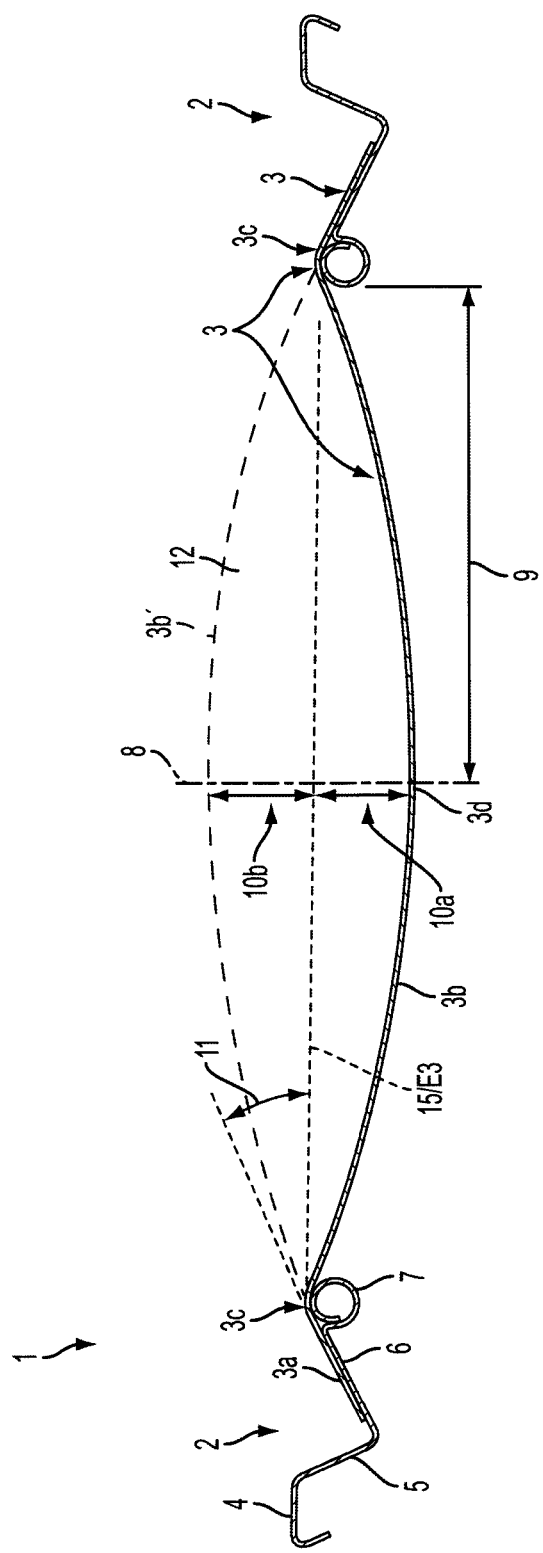
FIG. 1 shows a section through a lid according to one example of the invention.

As can be seen from FIG. 1, a lid 1 has an outer annular ring 2 suitable for seaming to a can body and a lid panel 3.

The annular ring 2 (for seaming to the can body, in short: "lid ring", seaming ring or "annular ring") is e.g. made of sheet metal. It comprises an outer rim portion 4 as a "flared flange" for firm and liquid tight connection with a rim 24 of an opening of the can body, cf. FIG. 3. The flange 4 is connected through a core wall 5 with the flat web 6 projecting generally radially inwards. The flat web 6 that extends all around is axially outwardly inclined or tilted at an angle larger than zero with respect to a horizontal plane that extends perpendicular to a vertical axis 8 of the lid 1. The radially inner edge of the flat web 6 is axially bent towards the inside and is designed in a sterile fashion, in particular by means of a curling 7. It may also be replaced with a relatively blunt inner edge. In the case of other can shapes, the lid shapes and the "annular ring" for seaming to the can body are accordingly adapted (seen in the horizontal direction).

The lid panel 3 comprises an outer continuous ring band 3a which at least partially covers the flat web 6 of the annular ring from the outside, if the panel 3 is tightly connected with the annular ring 2 in a fastening strip 13, e.g. by means of contact sealing or induction sealing (pressure sealing, ultrasonic sealing, laser sealing). This ring band 3a limits the central portion 3b (provides its outer limit), a transition portion 3c between the two being within the area of the curling 7 after connection of the panel with the annular ring.

The central cover portion 3b of the lid panel is preformed by a deep-drawing process. This process can be implemented prior to or after the connection of cover panel 3 and annular ring 2 in the fastening strip 13. The stabilizing reshaping only covers the central portion. It is implemented across the entire surface of the panel.

Figure 2:
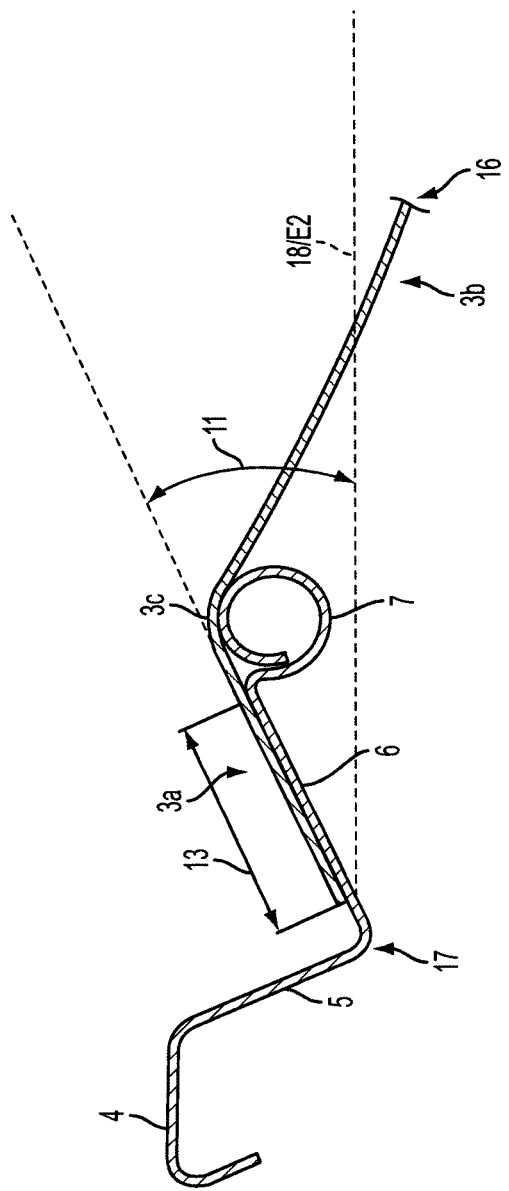
FIG. 2 shows the transition area between annular ring for seaming to the can body and lid diaphragm on a larger scale.

The preforming converts the central portion 3b into a dome or bowl shape in the axially inwards direction, the edge of the bowl is in the transition portion 3c to the outer ring band 3a and the lowermost centre 3d of the panel is clearly, in particular at least a few millimeters below a horizontal plane 18 that passes through the lowermost points of the annular ring 2 according to FIG. 2. This also corresponds to the plane E2 of FIG. 3 in the example.

It is advantageous if, as is preferred, the panel itself comprises a material that is stiffened or hardened by the deep-drawing process such as aluminum or the like, or contains at least such a layer. Due to this, the preformed central portion 3b is provided with an inner shape (or dimensional) stability. This is of advantage for the entire appearance of the finished, closed and thermally treated can package.

Figure 3:
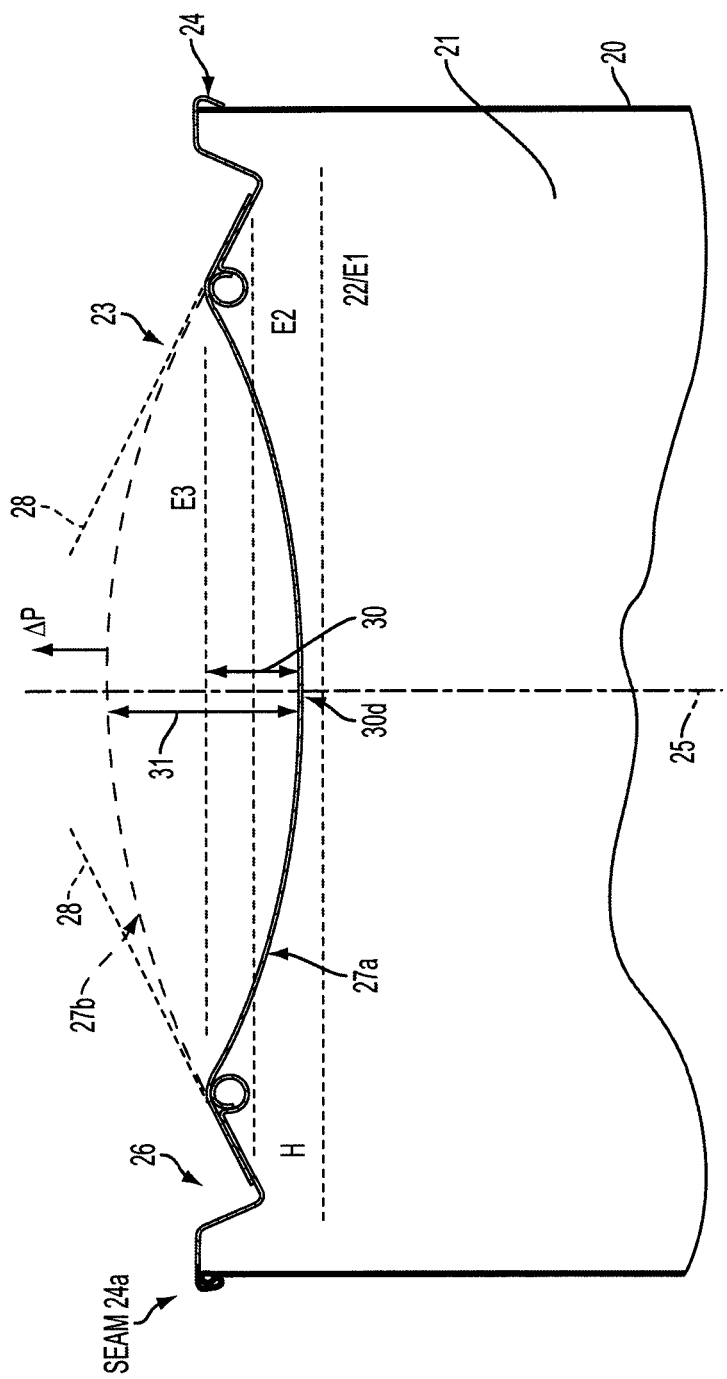
FIG. 3 shows a schematic sectional representation of a concrete example of a can with a predetermined diameter.

During sterilization, if temperature and consequently pressure are generated in the interior of the filled can that was closed with the lid (cf. also FIG. 3), the preformed central portion will change, in particular change abruptly, from its "die sunk", undulation-free dome/bowl shape to a practically mirror-inverted shape that is axially outwardly bulging (sphere shaped in the case of round cans) as it is outlined in a dash-dotted fashion at 3b' in FIG. 1 and FIG. 3.

Due to the stiffening or hardening of material of the cover panel achieved during the preforming, the dilatability of the central portion 3b is accordingly practically zero so that even in the case of high pressures formed in the can during (thermal) treatment in a continuous autoclave, the outwardly bulging shape of the central portion can be determined in advance (by means of a computing).

2-D Model.

FIG. 6 is a can with domed panel (pre shaped membrane) under internal pressure and cross section in FIG. 6a of the convex shaped panel. FIGS. 6 and 6a show the two-dimensional representation of a can with a domed panel under internal overpressure. The two-dimensional model of the pre-shaped domed panel shows its convex shape under internal over-pressure P. The parameters which indicate the geometry are given in the figures.

D is the diameter of the inner radius of the sealed zone, which is different from the can diameter, h is the dome deflection, y and z are the axes indicators, α is the angle of the dome with the y-axes. The volume increase, the angle and the radius of the convex dome can be calculated with the following equations:

$$\Delta V(h) = \frac{1}{6}\pi h^3 + \frac{1}{8}\pi h D^2 \quad [mm^3]$$

$$\alpha(y, h) = \sin\left(\frac{8yh}{D^2 + 4h^2}\right) \quad [rad]$$

$$\rho(h) = \frac{4h^2 + D^2}{8h} \quad [mm]$$

3-D Model.

Figure 7A:
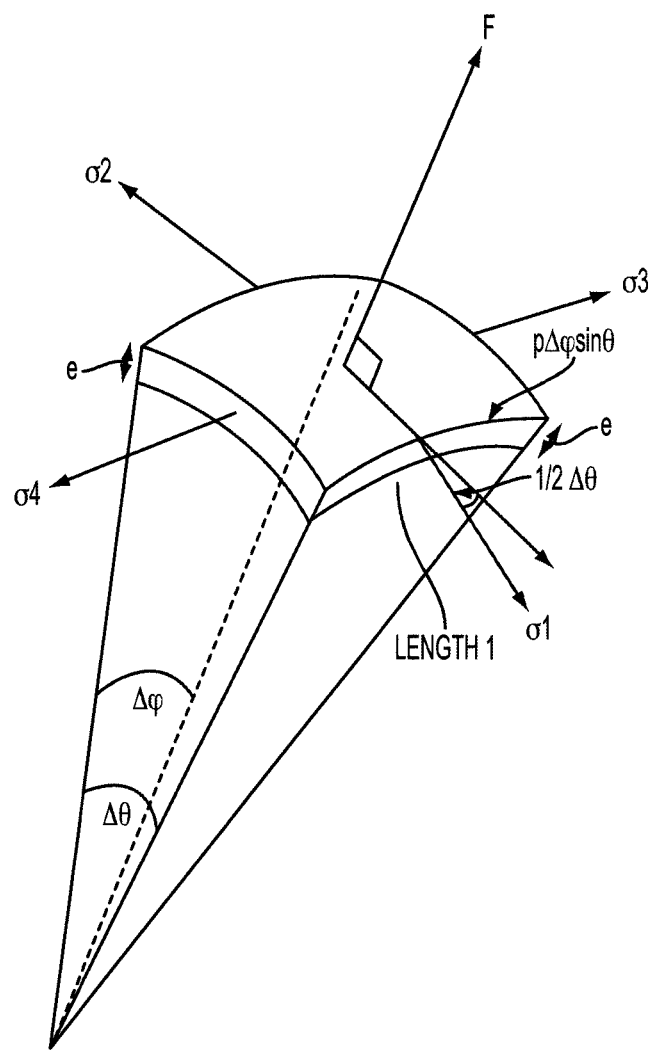
FIG. 7a is a 3D representation for explanation of force and tensile stress.

FIG. 7 is a convex shaped domed panel in 3-D coordinate system having x, y and z; φ, Θ (Theta) and ρ (rho). FIG. 7a displays a force F on a randomly chosen small part (segment) of the domed panel and a part cross-section of it.

Stress in Domed Panel.

The tensile stress in the domed panel can be calculated rather straight forward with FIG. 7a using the force known from the multiplication of the pressure and the surface segment. The force has to be divided over the length of the side (l) and the thickness (e) of the domed panel.

length1=ρΔφ sin θ[mm]
thickness=e [mm]

The tensile stresses on all sides are therefore given by $$\sigma_1 = \sigma_2 = \sigma_3 = \sigma_4 = \frac{P\rho}{2e} \quad \left[\frac{N}{mm^2}\right]$$

The radius of curvature of the domed panel can be expressed in can dimension parameters.

The tensile stress in the domed panel is $$\sigma_1 = P\frac{4h^2 + D^2}{16eh} \quad \frac{N}{mm^2} \rightarrow MPa$$

In this equation . . .
P is the pressure [N/mm²]
p is the radius of the convex shaped domed panel
e is the domed panel thickness
h is the deflection of the domed panel
D is the inner radius of the sealed zone.

Slanted Sealed Zone (Sealing Strip).

The sealed zone can be "bended up" in such a way that the sealed zone is slanted upwards (axially outward, or upwards) and parallel to the domed panel. In this situation there is only a shear stress in the sealed zone and no longer a peel stress. The following relation between the tensile stress in the panel and the shear stress in the sealed zone applies $$\sigma e = \sigma_s w \Rightarrow \sigma_s = \frac{e}{w}\sigma \quad MPa$$

In this case the shear stress can be calculated by $$\sigma_s = \frac{F}{w} = \frac{P\rho}{2w} = P\frac{D^2 + 4h^2}{16wh} \quad MPa$$

As outlined in FIG. 1, the depth 10a of the bowl shape and the depth 10b of the bulging are practically equal. Referred to the plane 15, the volume in the depth portion (defined by 10a) is equal to the volume in the depth portion (defined by 10b). The depths/distances of the centers of the deformed lid panel represent the volume formed vis-à-vis the central plane 15 or E3. Upon the closing of a can body with the lid 1, the headspace H of the can is reduced by the dome/bowl volume (between 15 and 3b) and, upon heating during sterilization, the volume of the headspace is enlarged by the total volume 12 (from depths 10a and 10b).

Both contribute to a clear reduction of the maximally occurring pressure and secure the closed cans against damage upon their passage through the autoclave. Pressures of less than 1 bar (0.1 MPa) can be achieved, which, without the preforming of the panel would be clearly above this value, e.g. at 1.5 bar (0.15 MPa). This amount of the achieved lowering of the pressure depends in general on the temperature of the foodstuff filled in. At hot filling of food the differential pressure that occurs as a maximum on the panel is lower than the differential pressure when using cold filling such as for pet food as "foodstuff".

The stability as to shape/form, i.e. the avoided permanent deformation (as a missing plastic deformation or—at most—a residual elastic deformation by means of the modulus of elasticity) of the central portion 3b contributes to the fact that, upon the cooling of the finished sterilized can, this preformed portion 3b practically exactly readopts the original dome/bowl shape. In both conditions or positions or according to panel shape 3b and 3b' no undulations are contained in the panel. The bowls or domes are smooth (also called bulged, but with a plane surface in the bulging).

The fact that the central portion retains its area (in an envelope) permits the advance calculation of the measure of its bulging in the case of the pressures to be expected as a maximum during sterilization so that the angle of inclination 11 of the flat web 6 of the annular ring 2 for seaming to the can body can be adjusted to this right from the beginning. By no means is the angle smaller than the angle of a tangent at the bulging of the central portion 3b (next to the slanted web). The angle 11 is rather selected larger with preference so that that—in the case of the maximum internal pressures formed in the continuous autoclaves—practically exclusively shear forces and no peeling forces are active as resultant forces in the ring band 3a of the panel 3 that is affixed to the flat web.

The angle 11 is set to more than 20°. The radius or the transverse dimension (in the case of a deviation from the circular shape) of the central portion is shown as 9. Reference 16 in FIG. 2 emphasizes that the portion 3b in its bowl shape projects down to clearly below the plane 18 which passes through the lowermost portions (or points) of the annular ring 2.

The dimensions of the preforming and that of the angle of inclination depend upon the volume and the radial dimensions of the can and thus also on the size of the lid. The smaller the radius of the bulging in a pressure-loaded condition is, the smaller is the mechanical stress in the lid panel.

A suitable material of the lid panel 3 is a thin metal, preferably an aluminum, which is used for the body diameter of 83 mm. Other diameters may be used in the following manner, in a range of diameters between substantially 50 mm and 100 mm (for Europe), in particular with especially customary diameters: 73 mm, 99 mm, 65 mm, 83 mm; similar for containers (bodies) made of steel sheet.

The can body may be made of aluminum or steel sheet that are covered with a varnish.

The annular ring 2 is preferably made from an aluminum covered with varnish, the outer varnish layer being a hot sealable sealing layer, which is sealingly connected with the annular ring in the sealing portion 13. Instead of metal the ring material may also be plastic material or a plastic/metal composite, e.g. produced by means of an injection process with or without an insert or with a previous inserting of the lid panel in the shaped opening for the ring. Annular rings made of steel can likewise be used.

Instead of the hot sealable layer on the ring, ring 2 may also be laminated or extruded with polymers. The lamination of the ring is done prior to the cutting out and the shaping of the annular ring.

In a preferred embodiment the lid panel that is connected with the annular ring (for seaming to the can body) preferably comprises several layers:
  coating varnish layer
  print layer
  aluminum layer (about 70 μm, in the range of 30 μm to 100 μm)
  extruded polymer layer (material with approx. 12 g/m² to 30 g/m²)

The extruded polymer layer is a co-extruded layer of a tie layer and a peel layer. Other extrusions and laminations can likewise be used.

The lid panel 3 was reshaped (deep-drawn) to a convex shape in the central area 3b as it is shown in FIG. 1 at 3b. In the example, the convex shape 3b has a radius of 110 mm. The lid layer was sealingly affixed to an initially horizontal flat strip, in a connection area 13 which is at first not upwardly inclined. The flat strip 6 of the ring 2, which supports the connection area was then upwardly deformed in order to obtain the inclination position of the angle 11 of about 24°, measured with respect to a horizontal plane 18/E2. This applies to the diameter of 83 mm of can and ring.

The sealing of the ring band 3a of the lid panel 3 can be achieved more easily with a horizontal flat web 6 than with an already inclined flat web. Consequently, the lid panel 3 may still not have any preforming shape of its own, but will only be provided with a corresponding preformed shape after the sealing in the connection area 13 as sealing strip. Here, the central area 3b is preformed to a bowl shape by means of the reshaping and stiffened or hardened, in order to admit hardly any elastic deformation, but to be capable of changing to a practically mirror-inverted, outwardly bulged bowl/dome shape in the case of an inner excess pressure. The central area is lowered that much below the plane 18 that there are several millimeters between the lowermost point of the initial bowl shape 3b and this plane (in the preformed state).

After the reshaping of the central area 3b an upwardly directed reshaping of the flat strip 6 (or the web) can be carried out. This obtains its inclination of more than 20° in this connection.

In a preferred embodiment that is not depicted these two re-shapings, that of the bowl-shaped bulging of the lid panel with a hardening, stiffening character and that of providing an inclination of an annular part the annular ring for seaming to the body, may also be carried out practically at the same time.

In the example there was a sealing strip 13 as the connection area of the still not preformed lid panel 3 on the initially horizontally oriented flat strip 6 of the ring, which was produced by implementing a sealing with the following parameters
  $\theta = 190°$ C. temperature
  P=150 kg Pressure
  t=300 msec Sealing time.

The inwardly bulged bowl/dome shape had—as represented above—a maximum deflection as the depth 10a after the upwardly directed inclination of the flat web 6 which depth was between 5 mm and 6 mm, with a mean value of about 5.6 mm within a probe of a plurality of tests.

FIG. 3 elucidates again the important advantages of the lid that is capable of expansion.

The lid 23 is shown in its position after firmly and tightly fixed to a can body 20, which is filled with the foodstuff 21 and then closed. A symbolic filling height is outlined at 22 or the level E1, above which the headspace H filled with air or vapor is located. The axis of the can is designated 25. The annular ring (for seaming to the can body) and the can body rim are connected with each other in customary fashion by means of a double seam 24a at the end 24 of the container (represented in a seamed fashion on the left-hand side, and in a placed fashion on the right-hand side in FIG. 3). The connection area between the flat web of the annular ring and the ring band of the lid panel is designated 26. The central portion 27a is deep-drawn in a dome/bowl-shaped fashion. Its depth 30 is represented exaggerated in order to display that it clearly reaches below the lowermost portion (plane E2) of the annular ring for seaming to the can body. The bowl volume defined by its depth 30 reduces the headspace H by the same volume, whereas the volume allocated to the double arrow 31 and limited by the central portion in its concave dome/bowl and convex bulging shapes outlines the volume enlargement of the headspace H with maximum pressure load ΔP during thermal sterilization. The broken line extension 28 of the flat web makes it clear that the angle of the flat web is larger than the angle 11 of the tangent to the bulging 27b.

Figure 4:
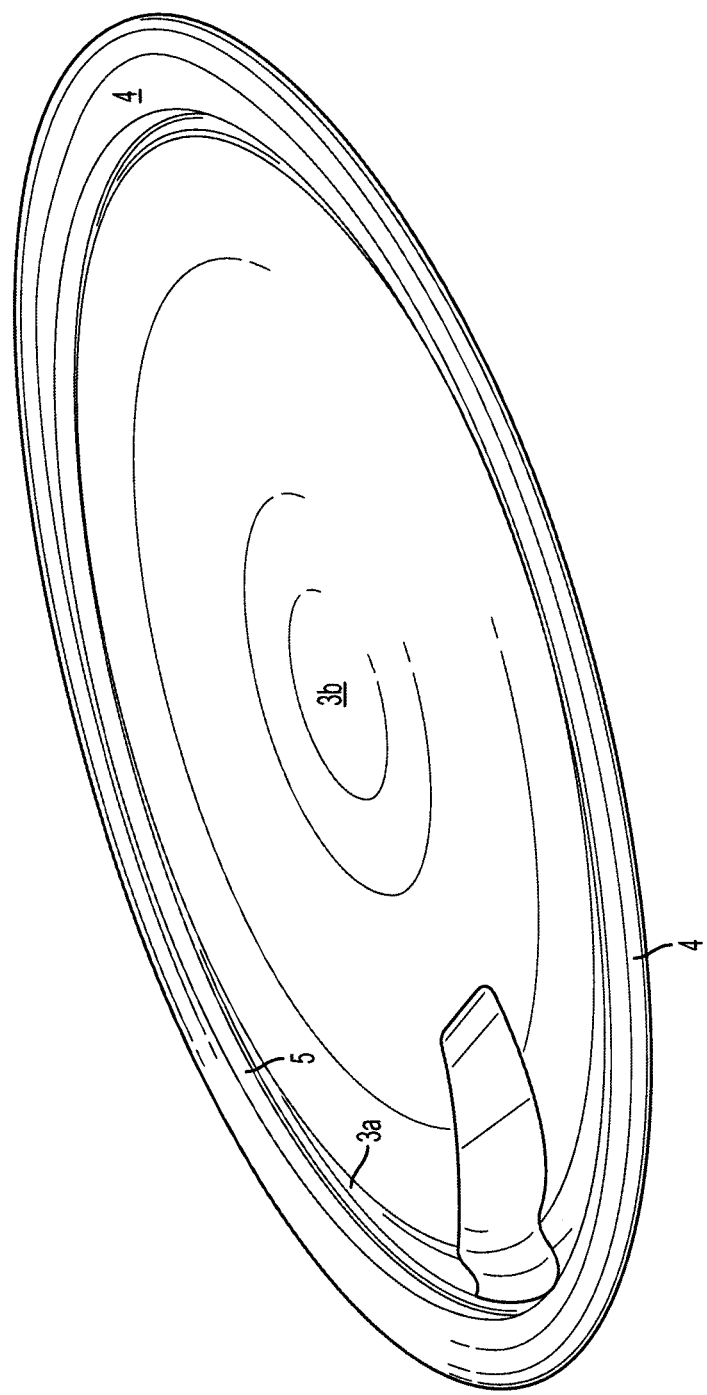
FIG. 4 shows a representation of a concrete example of a preformed lid panel.
Figure 5:
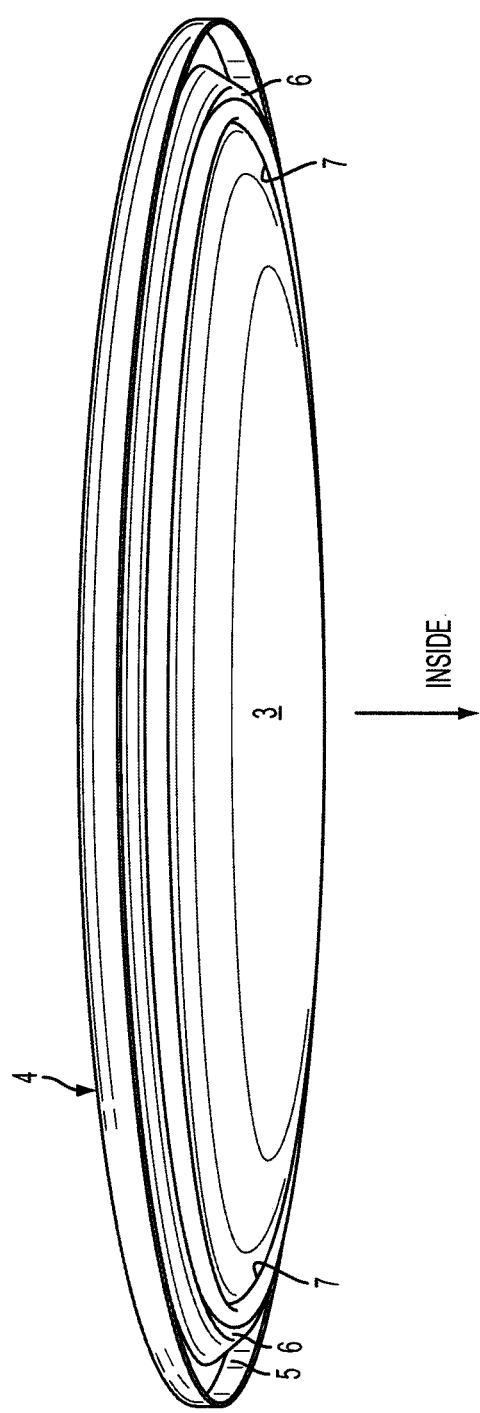
FIG. 5 shows a lateral view of a representation of the concrete example.

A lid for a can with a diameter of 83 mm is assumed as a further practical example. The dome/bowl depth 10a/30 of the preformed lid panel is between 5 mm and 6 mm, about 5.6 mm, the lowermost point 30d of the bowl being about 3 mm below the lowermost points of the annular ring. The bulging corresponds to a sphere portion—in the case of a circular cross—section of the lid as is shown by FIGS. 4 and 5. The angle 11 is between 22° and 25°. Here, peeling forces are practically completely avoided.

The reference symbols in FIGS. 4 and 5 are consistent with the ones used before. FIG. 4 additionally shows a tab to pulling off the panel 3 (having sealed ring band 3*b* and central panel 3*a*).

The smooth/plane dome/bowl surface is not disturbed by any undulations or grooves. The can may be at least pasteurized, in particular sterilized with the lid in practically each of the known continuous autoclaves without counter-pressure means.

We claim:

1. A process for producing a lid closure for cans containing foodstuff, the lid providing tightness during sterilization or pasteurization in a continuous autoclave, said cans being closed with a can closure, comprising:
    producing the can closure from an annular ring adapted for seaming to the can body and a lid panel having an outer ring band sealingly affixed onto an inner flat web;
    reshaping a central area of the lid panel by deep drawing to a smooth bowl shape or a dome shape with a plane surface, as original shape, a material of this central area thereby solidified or hardened to such an extent that under an increased pressure in a headspace of the can during a passage thereof through an autoclave station, the central area changes to an axially outwardly bulged shape that is mirror-inverted with respect to the original shape and, during a subsequent cooling of the can, the central area automatically returns substantially to the original shape thereof;
    wherein the reshaping is done prior to attaching the lid to the filled can; and
    wherein the lid panel is limited by an outer ring band.

2. The process of claim 1, wherein the central area of the lid panel is deep-drawn after the outer ring band is sealingly affixed to the flat web of the annular ring.

3. The process of claim 1, wherein the flat web of the annular ring is upwardly re-shaped after the lid panel is sealingly affixed to the flat web of the annular ring, wherein the flat web is planar at sealing.

4. The process of claim 2, wherein the lowering deep drawing of the lid panel and an upwards re-shaping of the flat web take place substantially at the same time.

5. The process of claim 1, wherein the central area of the lid panel is deep-drawn prior to affixing the central area of the lid panel to the flat web of the annular ring.

6. The process of claim 1, wherein the flat web is inclined when it is sealingly affixed.

7. The process of claim 6, wherein an angle of inclination of the flat web is between about 20° and about 30°.

8. The process of claim 1, wherein the can has a diameter of about 83 mm, and an axial distance of the center of the central area preformed in a bowl-shaped fashion is downwardly shifted due to the reshaping from a horizontal reference plane by between about 5 mm and about 6 mm.

9. The process of claim 1, wherein the ring band is sealingly affixed to the flat web by hot sealing.

10. The process of claim 1, wherein the solidification or hardening is distributed or acts across substantially the entire central area.

11. The process of claim 8, wherein the axial distance of the center of the central area preformed in a bowl-shaped fashion is downwardly shifted due to the reshaping from a horizontal reference plane by about 5.6 mm.

12. The process of claim 9, wherein the hot sealing process is an induction process.

* * * * *